United States Patent
Reddy

(10) Patent No.: US 10,947,795 B2
(45) Date of Patent: *Mar. 16, 2021

(54) OIL-SWELLABLE, SURFACE-TREATED ELASTOMERIC POLYMER AND METHODS OF USING THE SAME FOR CONTROLLING LOSSES OF NON-AQUEOUS WELLBORE TREATMENT FLUIDS TO THE SUBTERRANEAN FORMATION

(71) Applicant: Saudi Arabian Oil Company, Dhahran (SA)

(72) Inventor: B. Raghava Reddy, Pearland, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,720

(22) Filed: Feb. 17, 2020

(65) Prior Publication Data

US 2020/0181993 A1   Jun. 11, 2020

Related U.S. Application Data

(63) Continuation of application No. 15/829,520, filed on Dec. 1, 2017, now Pat. No. 10,619,432.

(60) Provisional application No. 62/507,541, filed on May 17, 2017.

(51) Int. Cl.
| | | |
|---|---|---|
| *C09K 8/512* | (2006.01) | |
| *E21B 21/00* | (2006.01) | |
| *C09K 8/12* | (2006.01) | |
| *C09K 8/508* | (2006.01) | |

(52) U.S. Cl.
CPC .............. *E21B 21/003* (2013.01); *C09K 8/12* (2013.01); *C09K 8/5086* (2013.01); *C09K 8/512* (2013.01); *C09K 2208/18* (2013.01)

(58) Field of Classification Search
CPC ........ C09K 8/035; C09K 8/512; C09K 8/508; C09K 8/44; C09K 8/805; C09K 8/467; C09K 8/516; C09K 8/68; C09K 8/685; C09K 2208/02; C09K 8/5086; C09K 8/62; C09K 8/80; C09K 2208/18; C09K 8/12; C09K 8/24; C09K 8/32; C09K 8/42; C09K 8/487; C09K 8/502; C09K 8/5045; C09K 8/5751; C09K 8/64; C09K 8/52; C09K 8/565; C09K 8/70; C09K 8/88; C09K 2208/12; C09K 8/50; C09K 8/602; C09K 8/725; C09K 8/74; C09K 8/60; C09K 8/887; C09K 8/92; C09K 2208/08; C09K 2208/24; C09K 2208/26; C09K 2208/28; C09K 2208/32; C09K 8/426; C09K 8/504; C09K 8/506; C09K 8/54; C09K 8/5756; C09K 8/882; C09K 8/885; C09K 8/90; E21B 21/003; E21B 43/26; E21B 43/267; E21B 33/138; E21B 33/14; E21B 43/11; E21B 47/123; E21B 47/124; E21B 49/00

See application file for complete search history.

(56) References Cited

U.S. PATENT DOCUMENTS

| | | | |
|---|---|---|---|
| 3,336,979 A | 8/1967 | Ingraham et al. | |
| 3,353,601 A | 11/1967 | Dollarhide et al. | |
| 4,172,066 A | 10/1979 | Zweigle et al. | |
| 4,522,957 A * | 6/1985 | Ashley ................... | B29B 7/945 427/222 |
| 4,529,656 A | 7/1985 | Haigh et al. | |
| 4,704,213 A | 11/1987 | Delhommer et al. | |
| 4,772,635 A | 9/1988 | Mitschker et al. | |
| 5,161,615 A | 11/1992 | Hutchins et al. | |
| 5,292,810 A | 3/1994 | Manabe et al. | |
| 5,317,059 A | 5/1994 | Chundury et al. | |
| 5,362,787 A * | 11/1994 | Ngoc ................... | C08F 236/12 524/297 |
| 5,465,792 A | 11/1995 | Dawson et al. | |
| 6,518,224 B2 | 2/2003 | Wood | |
| 7,267,174 B2 | 9/2007 | Gonsveld et al. | |
| 7,341,106 B2 | 3/2008 | Reddy et al. | |
| 7,395,863 B2 | 7/2008 | Wang et al. | |

(Continued)

FOREIGN PATENT DOCUMENTS

| | | |
|---|---|---|
| EP | 2942374 A1 | 11/2015 |
| GB | 718168 A | 11/1954 |

(Continued)

OTHER PUBLICATIONS

International Search Report and Written Opinion for International Application No. PCT/US2018/033162, dated Jul. 5, 2018 (pp. 1-14).

(Continued)

*Primary Examiner* — Kumar R Bhushan
(74) *Attorney, Agent, or Firm* — Bracewell LLP; Constance G. Rhebergen; Brian H. Tompkins

(57) ABSTRACT

An oil-swellable lost circulation material (LCM) formed from an elastomeric polymer and a crosslinker amine is provided. The LCM may be formed from elastomeric polymer particles, a crosslinker amine, an anti-agglomerating agent, and may also be formed using a cure accelerator. A mixture of the elastomeric polymer particles, the crosslinker amine, the anti-agglomerating agent, and in some mixtures the cure accelerator, may be hot rolled at a temperature of at least 120° F. for a duration. The resulting LCM may swell by absorbing about 20 to about 34 times its weight when introduced to a loss circulation zone in the presence of a non-aqueous fluid such as a drilling mud or component of a drilling mud.

14 Claims, 3 Drawing Sheets

(56) References Cited

U.S. PATENT DOCUMENTS

| | | |
|---|---|---|
| 7,510,004 B1 | 3/2009 | Hessert et al. |
| 7,530,396 B1 | 5/2009 | Reddy et al. |
| 7,617,870 B1 | 11/2009 | Roddy et al. |
| 7,748,452 B2 | 7/2010 | Sullivan et al. |
| 7,776,797 B2 | 8/2010 | Allin et al. |
| 7,888,296 B2 | 2/2011 | Morris et al. |
| 7,923,413 B2 | 4/2011 | Ghassemzadeh |
| 7,928,042 B2 | 4/2011 | Reed et al. |
| 7,947,630 B2 | 5/2011 | Atkins et al. |
| 8,132,623 B2 | 3/2012 | Allin et al. |
| 9,139,762 B2 | 9/2015 | Moradi-Araghi et al. |
| 9,206,346 B2 | 12/2015 | Kurian et al. |
| 9,260,650 B2 | 2/2016 | Nguyen |
| 9,267,075 B2 | 2/2016 | Moradi-Araghi et al. |
| 2002/0010100 A1 | 1/2002 | Wood |
| 2003/0194504 A1 | 10/2003 | Bilyk et al. |
| 2005/0080176 A1 | 4/2005 | Robb |
| 2006/0122071 A1 | 6/2006 | Reddy et al. |
| 2007/0068816 A1 | 3/2007 | Solomon et al. |
| 2007/0193171 A1 | 8/2007 | Finerman et al. |
| 2007/0204989 A1 | 9/2007 | Tang |
| 2009/0258963 A1* | 10/2009 | Moore ............... C08G 59/3209 522/100 |
| 2010/0240802 A1 | 9/2010 | Matzinger et al. |
| 2012/0059103 A1* | 3/2012 | Lux ..................... C09J 5/02 524/388 |
| 2013/0184409 A1* | 7/2013 | Fujisawa ............ B29C 45/00 525/67 |
| 2014/0349894 A1 | 11/2014 | Quintero et al. |
| 2015/0211330 A1 | 7/2015 | Daou et al. |
| 2015/0252638 A1 | 9/2015 | Richards et al. |
| 2016/0145486 A1 | 5/2016 | Weaver et al. |
| 2017/0073555 A1 | 3/2017 | Reddy |
| 2017/0174977 A1 | 6/2017 | Bulte-Loyer et al. |

FOREIGN PATENT DOCUMENTS

| | | |
|---|---|---|
| GB | 1441340 A | 6/1976 |
| JP | 55145727 | 11/1980 |
| WO | 2010019535 A2 | 2/2010 |

OTHER PUBLICATIONS

International Search Report and Written Opinion for related PCT application PCT/US2018/033174; dated Sep. 18, 2018 (pp. 1-14).

* cited by examiner

OIL-SWELLABLE, SURFACE-TREATED ELASTOMERIC POLYMER AND METHODS OF USING THE SAME FOR CONTROLLING LOSSES OF NON-AQUEOUS WELLBORE TREATMENT FLUIDS TO THE SUBTERRANEAN FORMATION

CROSS-REFERENCE TO RELATED APPLICATIONS

This application is a continuation of and claims priority to U.S. Non-Provisional Application No. 15/829,520 filed Dec. 1, 2017, and titled "OIL-SWELLABLE, SURFACE-TREATED ELASTOMERIC POLYMER AND METHODS OF USING THE SAME FOR CONTROLLING LOSSES OF NON-AQUEOUS WELLBORE TREATMENT FLUIDS TO THE SUBTERRANEAN FORMATION," which claims priority from U.S. Provisional Application No. 62/507,541 filed May 17, 2017, and titled "OIL-SWELLABLE, SURFACE-TREATED ELASTOMERIC POLYMER AND METHODS OF USING THE SAME FOR CONTROLLING LOSSES OF NON-AQUEOUS WELLBORE TREATMENT FLUIDS TO THE SUBTERRANEAN FORMATION," Each of which are incorporated by reference in their entirety for purposes of United States patent practice.

BACKGROUND

Field of the Disclosure

Embodiments of the disclosure generally relate to controlling lost circulation in a well and, more specifically, to lost circulation materials (LCMs).

Description of the Related Art

Various challenges are encountered during drilling and production operations of oil and gas wells. For example, fluids used in drilling, completion, or servicing of a wellbore, such as non-aqueous fluids like synthetic-based muds (SBM) and oil-based muds (OBM), can be lost to the subterranean formation while circulating the fluids in the wellbore. Such lost circulation can be encountered during any stage of operations and occurs when drilling fluid (or drilling mud) pumped into a well returns partially or does not return to the surface. While de minimis fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. The severity of the lost circulation depends on the amount of fluid lost and the dimension of the lost circulation zone.

SUMMARY

Lost circulation materials (LCMs) are used to mitigate lost circulation by blocking the path of the drilling mud into the formation. The type of LCM used in a lost circulation situation depends on the extent of lost circulation and the type of formation. While relatively low circulation losses of drilling fluids can be treated with conventional pills having lost circulation materials such as fibers or graded particles, heavy losses cannot be similarly treated because of the large dimensions of lost circulation zones.

Embodiments of the disclosure generally relate to a lost circulation material that can swell but not dissolve when placed in contact with a non-aqueous fluid such as a synthetic-based mud (SBM) or oil-based mud (OBM). In one embodiment, a method of forming a lost circulation material (LCM) is provided. The method includes mixing a plurality of elastomeric polymer particles with a crosslinker to form a first mixture. The elastomeric polymer includes an olefinically unsaturated hydrocarbon monomer and a monomer having an epoxy pendant group, and the crosslinker is an amine. The method further includes adding an anti-agglomerating agent to the first mixture to form a second mixture and agitating the second mixture at a temperature of at least 120° F. for a duration to produce the lost circulation material (LCM).

In some embodiments, mixing the plurality of elastomeric polymer particles with the crosslinker to form the first mixture further includes mixing a cure accelerator with the plurality of elastomeric polymer particles and the crosslinker to form the first mixture. In some embodiments, the cure accelerator includes an alkanolamine. In some embodiments, the weight ratio of the crosslinker to the cure accelerator is at least 10:1. In some embodiments, the duration is at least one hour, at least two hours, or at least three hours. In some embodiments, the elastomeric polymer particles are ethylene/methyl acrylate/glycidyl methacrylate terpolymer particles or ethylene/glycidyl methacrylate copolymer particles. In some embodiments, the amine includes an aliphatic polyamine amine, a polyether amine, or an aromatic polyamine. In some embodiments, the amine includes at least one of: tetraethylene pentaamine (TEPA), triethylene glycol diamine (TEGDA), polyoxypropylene triamine (POPTA), polyoxypropylene diamine (POPDA), and diethyltoluenediamine (DETDA). In some embodiments, the anti-agglomerating agent is silica powder. In some embodiments, agitating the second mixture at a temperature of at least 120° F. for a duration includes rolling the second mixture in a roller oven. In some embodiments, the weight ratio of the elastomeric polymer particles to the crosslinker and cure accelerator is in the range of 50:1 to 500:1. In some embodiments, the method includes selecting the duration to determine a swelling capability of the LCM. In some embodiments, the swelling capability is a swell index. In such embodiments, the swell index is a difference between a dry weight of the LCM and the wet weight of the LCM divided by the dry weight, such that the wet weight is a weight of the LCM after swelling in a solvent and the dry weight is the weight of the LCM after evaporation of the solvent.

In some embodiments, a composition for forming a lost circulation material (LCM) is provided. The composition includes a plurality of elastomeric polymer particles, a crosslinker consisting of an amine, and an anti-agglomerating agent. The elastomeric polymer having an olefinically unsaturated hydrocarbon monomer and a monomer having an epoxy pendant group. In some embodiments, the elastomeric polymer particles include ethylene/methyl acrylate/glycidyl methacrylate terpolymer particles or ethylene/glycidyl methacrylate copolymer particles. In some embodiments, the amine includes an aliphatic polyamine amine, a polyether amine, or an aromatic polyamine. In some embodiments, the amine includes at least one of: tetraethylene pentaamine (TEPA), triethylene glycol diamine (TEGDA), polyoxypropylene triamine (POPTA), polyoxypropylene diamine (POPDA), and diethyltoluenediamine (DETDA). In some embodiments, the anti-agglomerating agent is silica powder. In some embodiments, the composition consists of the elastomeric polymer, the crosslinker consisting of an amine, and the anti-agglomerating agent. In some embodiments, the LCM absorbs 20 to 34 times its weight of a non-aqueous fluid. In some embodiments, the composition includes a cure accelerator. In some embodiments, the cure accelerator is an alkanolamine. In some embodiments, the weight ratio of the crosslinker to the cure accelerator is at least 10:1. In some embodiments, the composition consists of the elastomeric polymer, the crosslinker consisting of an amine, the cure accelerator, and the anti-agglomerating agent. In some embodiments, the weight ratio of the elastomeric polymer particles to the crosslinker and cure accelerator is in the range of 50:1 to 500:1.

In another embodiment, a method to control lost circulation in a well is provided. The method includes introducing a lost circulation material (LCM) into the wellbore such that the LCM contacts the lost circulation zone and reduces a rate of lost circulation into the lost circulation zone as compared to a period before introducing the LCM. The LCM is formed from a plurality of elastomeric polymer particles and a crosslinker that is an amine. The elastomeric polymer has an olefinically unsaturated hydrocarbon monomer and a monomer having an epoxy pendant group. In some embodiments, introducing the LCM into the wellbore includes mixing the LCM with a non-swellable carrier fluid and pumping the non-swellable carrier fluid and LCM into the wellbore. In some embodiments, the non-swellable carrier fluid includes an alcohol, a ketone, or an alcohol ether. In some embodiments, the elastomeric polymer particles include ethylene/methyl acrylate/glycidyl methacrylate terpolymer particles or particles or ethylene/glycidyl methacrylate copolymer particles. In some embodiments, the amine includes an aliphatic polyamine amine, a polyether amine, or an aromatic polyamine. In some embodiments, the amine includes at least one of tetraethylene pentaamine (TEPA), triethylene glycol diamine (TEGDA), polyoxypropylene triamine (POPTA), and diethyltoluenediamine (DETDA). In some embodiments, the method includes maintaining the LCM in contact with the lost circulation zone for a contact period, such that the LCM interacts with a non-aqueous fluid in the lost circulation zone. In some embodiments, the non-aqueous fluid includes a synthetic-based mud (SBM) or an oil-based mud (OBM).

DETAILED DESCRIPTION

Figure 1:
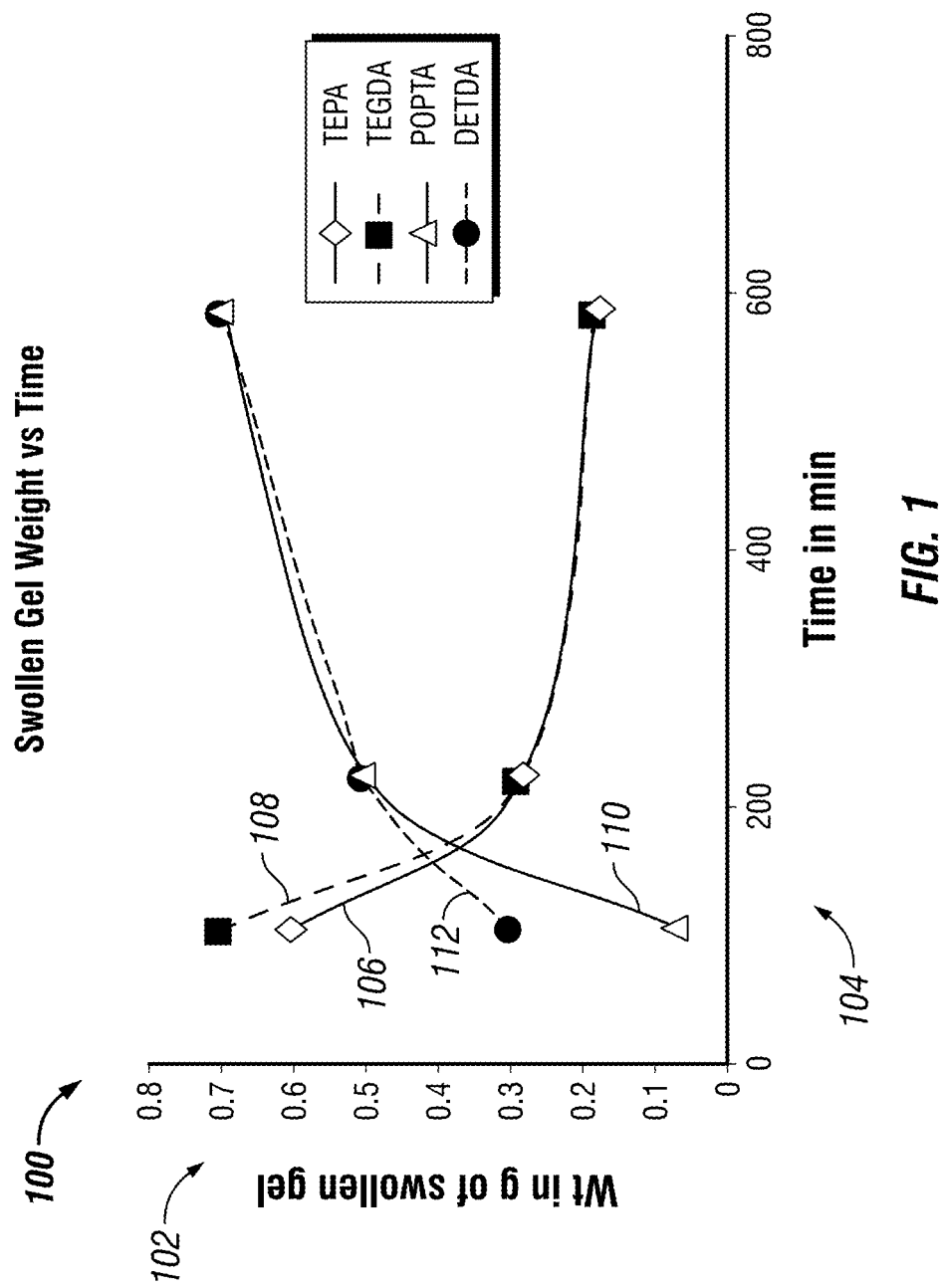
FIG. 1 is a plot of the wet weight vs. hot roll duration for example compositions in accordance with embodiments of the disclosure.

The present disclosure will now be described more fully hereinafter with reference to the accompanying drawings, which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art.

Embodiments of the disclosure include an oil-swellable lost circulation material (LCM) formed from an elastomeric polymer and a crosslinker amine. In some embodiments, the elastomeric polymer includes a monomer with an epoxy pendant group. In some embodiments, the LCM is formed from elastomeric polymer particles, a crosslinker amine, a cure accelerator suitable for amines, and an anti-agglomerating agent. As used herein, the term "particles" includes beads, pellets, and other forms of the elastomeric polymer.

In some embodiments, the elastomeric polymer is a copolymer having an olefinically unsaturated hydrocarbon monomer and a monomer having an epoxy pendant group. In some embodiments, the monomer having an epoxy pendant group may be a glycidyl acrylate monomer (for example, glycidyl methacrylate). In some embodiments, the molar ratio of unsaturated hydrocarbon monomer to epoxy containing monomer is in the range of about 75:25 to about 99:1. In some embodiments the elastomeric polymer includes an additional polar monomer. In some embodiments, the molar ratio of the sum of olefinically unsaturated hydrocarbon monomer and the polar monomer to epoxy containing monomer is in the range of about 75:25 to about 99:1. Examples of suitable polar monomers include olefinically unsaturated esters. In some embodiments, suitable olefinically unsaturated esters include methyl acrylate, methyl methacryalate, ethyl acrylate, ethyl methacrylate, butyl acrylate, and butyl methacrylate. In some embodiments, the elastomeric polymer particles may be ethylene/methyl acrylate/glycidyl methacrylate terpolymer. In some embodiments, the elastomeric polymer particles may be ethylene/glycidyl methacrylate copolymer. In some embodiments, the elastomeric polymer may be Lotader® AX8840 or Lotader® AX8900 available from Arkema Inc., of King of Prussia, Philadelphia, USA. In some embodiments, the elastomer particles may be substantially spherical, oval, cylindrical, flat, or irregular in shape. In some embodiments, the melt index of the elastomeric polymer particles may be in the range of about 5 kilograms (kg)/10 minutes to about 300 kg/10 minutes. In some embodiments, the crosslinker amine may be an aliphatic polyamine amine (for example, polyethyleneimine and ethylene diamine and its homologs), polyether amines (for example polyethylene glycol polyamines and polypropylene glycol polyamines), and aromatic polyamines (such as toluene diamines and phenylenediamines). In some embodiments, the crosslinker amine is tetraethylene pentaamine (TEPA), triethylene glycol diamine (TEGDA), polyoxypropylene triamine (POPTA), polyoxypropylene diamine (POPDA), or diethyltoluenediamine (DETDA). In other embodiments, the crosslinker amines may include the crosslinker amines described in U.S. Publication No. 2017/0073555 titled "Pendant Epoxide Polymers and Methods of Treating Subterranean Formations," a copy of which is hereby incorporated by reference for the purposes of United States patent practice. In some embodiments, the weight ratio of elastomeric polymer to crosslinker is in the range of about 10:1 to about 4:1.

In some embodiments, the cure accelerator is an accelerator having both hydroxyl groups and reactive amine groups. In some embodiments, the weight ratio of amine to cure accelerator is in the range of about 100:1 to about 5:1. In some embodiments, the anti-agglomerating agent may be any suitable inorganic powder. For example, in some embodiments, the anti-agglomerating agent may include silica powder, clay, and talc. In some embodiments, the silica powder is precipitated silica powder. Examples of suitable silica powders area available under the name Sipernat® available from Evonik Industries of Essen, Germany. In some embodiments, for example, the silica powder may have a d50 particle size distribution of 85 µm. In some embodiments, the anti-agglomerating agent is added in amounts of about 0.1 wt % to about 20 wt % of the elastomeric polymer particles.

The oil-swellable LCM composition may be formed by mixing elastomeric polymer particles with a crosslinker amine and, in some embodiments, with a cure accelerator. In some embodiments, the crosslinker amine, the cure accelerator, or both may be pre-dissolved in a solvent prior to application to the surface of the elastomeric polymer particles. In some embodiments, the crosslinker amine, or the crosslinker amine and cure accelerator mixture, may be applied to the surface of the elastomeric polymer particles by spray coating or by dripping of the mixture in liquid form on the elastomeric polymer particles. The resulting polymer-crosslinker mixture or polymer-crosslinker-accelerator mixture may then be mixed with the anti-agglomerating agent. The polymer-crosslinker-anti-agglomerating agent mixture or polymer-crosslinker-accelerator-anti-agglomerating agent may be agitated at a temperature of at least 120° F. (for example, hot rolled) for a duration, such as at least one hour, at least two hours, at least three hours, or greater than three hours. For example, in some embodiments, the mixture may be agitated at a temperature of at least 150° F., such as 200° F. The particles of the resulting LCM composition may be substantially spherical, oval, cylindrical, flat or irregular in shape. The resulting LCM composition may swell by absorbing at least about 20 to about 34 times its weight when introduced to a lost circulation zone in the presence of a non-aqueous fluid such as a drilling mud or component of a drilling mud.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

Example oil-swellable elastomeric polymer and crosslinker amine compositions were prepared and tested according to the techniques described herein. The example oil-swellable surface-treated elastomeric polymer particles were prepared from commercially available pellets of ethylene/methyl acrylate/glycidyl methacrylate terpolymer with the monomers having weight percentages of about 64:24:8 respectively. In some embodiments, the elastomeric polymer may be Lotader® AX8900 available from Arkema Inc., of King of Prussia, Philadelphia, USA. A mixture of a crosslinker amine and a cure accelerator was also prepared. The cure accelerator was Accelerator 399 available from Huntsman Corporation of The Woodlands, Tex., USA.

The ethylene/methyl acrylate/glycidyl methacrylate terpolymer was combined with the crosslinker amine and cure accelerator mixture in a weight ratio of 10:1 and shaken. High surface area silica powder was added to the polymer-crosslinker-accelerator mixture in an amount of 0.5 weight % of the terpolymer. The silica powder was Sipernat® 625 available from Evonik Industries of Essen, Germany, and had a d50 particle size distribution of 85 µm. Separate experiments were conducted without the addition of silica powder to the mixture as an anti-agglomerating agent, and the resulting solid product was clumpy and agglomerated.

The polymer-crosslinker-accelerator-silica powder mixture was hot rolled in a roller oven at a temperature of about 200° F. for different durations. At the end of each duration, two pellets were removed and added to 5 mL of xylene in a tightly capped bottle. The bottle having the two pellets and xylene was placed in an oven at a temperature of about 180° F. for about 48 hours. The free-flowing xylene was then poured out from the bottle and the wet weight of the swollen product was measured. After measuring the wet weight of the swollen pellets, the solvent from the swollen product was allowed to evaporate, and the dry weight of the dried product was measured. The difference between the dry weight and the wet weight of the product indicated the amounts of the terpolymer that dissolved in xylene, and the amount of solvent that was crosslinked and participated in swelling when placed in xylene.

Four polymer-crosslinker-accelerator-silica powder compositions were prepared using four different crosslinker amines: tetraethylene pentaamine (TEPA), triethylene glycol diamine (TEGDA) available as Jeffamine EDR 148 from Huntsman Corporation of The Woodlands, Tex., USA, polyoxypropylene triamine (POPTA) available as Jeffamine T403 from Huntsman Corporation of The Woodlands, Tex., USA, and diethyltoluenediamine (DETDA).

To conduct the experiments, 2 grams of ethylene/methyl acrylate/glycidyl methacrylate terpolymer pellets were combined with 0.01 g of the amine-cure accelerator mixture (that is, in a weight ratio of 200:1). An amount of 0.01 g (that is, 0.5 weight % of the ethylene/methyl acrylate/glycidyl methacrylate terpolymer pellets) of silica powder was added to the terpolymer-crosslinker-accelerator mixture. As described above, each polymer-crosslinker-accelerator-silica powder mixture was hot rolled in a roller oven at a temperature of about 200° F. for three different durations. The wet weights and dry weights of the solid product were measured as described above.

A swell index for each solid product was calculated by subtracting the dry weight (that is, the weight of dry crosslinked polymer recovered from the swollen product) from the wet weight and dividing by the dry weight. The percent increase in weight due to swelling was calculated by dividing the wet weight of the product by the dry weight of the product. The swelling measurements were performed at 180° F.

Table 1 shows the hot roll durations at 200° F., the wet weight, dry weight, % of the terpolymer pellet mass that was crosslinked, the swell index, and the percent increase in weight for each polymer-crosslinker-accelerator-silica powder composition and duration:

TABLE 1

HOT ROLLING DURATIONS AND RESULTING PROPERTIES FOR
EXAMPLE OIL-SWELLABLE ELASTOMERIC POLYMER AND CROSSLINKER
AMINE COMPOSITIONS WITH CURE ACCELERATOR

| Amine | Hot Roll Duration (hours:min) | Wet weight of swollen product per 0.06 g of hot rolled pellets (g) | Dry weight of dried product (g) | % terpolymer pellet mass crosslinked | Swell index | % increase in weight |
|---|---|---|---|---|---|---|
| TEPA | 1:45 | 0.60 | 0.06 | 100 | 9 | 1000 |
| TEPA | 3:45 | 0.28 | 0.06 | 100 | 3.7 | 467 |
| TEPA | 9:45 | 0.18 | 0.06 | 100 | 2 | 300 |
| TEGDA | 1:45 | 0.70 | 0.04 | 67 | 17 | 1800 |
| TEGDA | 3:45 | 0.28 | 0.06 | 100 | 3.7 | 467 |
| TEGDA | 9:45 | 0.18 | 0.06 | 100 | 2 | 300 |
| POPTA | 1:45 | 0.07 | <0.01 | <17 | >6 | >700 |
| POPTA | 3:45 | 0.5 | 0.03 | 50 | 15.7 | 1667 |
| POPTA | 9:45 | 0.7 | 0.06 | 100 | 10 | 1100 |
| DETDA | 1:45 | 0.30 | <0.01 | <17 | >29 | >3000 |
| DETDA | 3:45 | 0.5 | 0.02 | 33 | 24 | 2500 |
| DETDA | 9:45 | 0.70 | 0.02 | 33 | 34 | 3500 |

FIG. 1 is a plot 100 of the wet weight (depicted on the y-axis 102) vs. the hot roll duration (depicted on the x-axis 104) for each tested composition. As shown in FIG. 1, line 106 corresponds to the mixture having TEPA, line 108 corresponds to the mixture having TEGDA, line 110 corresponds to the mixture having POPTA, and line 112 corresponds to the mixture having DETDA.

As shown in FIG. 1, the swelling decreases with time for TEPA and TEGDA and increases with time for POPTA and DETDA. As shown in Table 1, the TEPA crosslinker crosslinked 100% of the terpolymer mass of the pellets by 1 hour and 45 minutes, as indicated by the dry weight from the swollen product. However, as also shown in Table 1, the decreasing swell index indicates that the crosslinking continued with time. This effect is likely due to excessive crosslinking, as the product became very brittle after a hot roll duration of 9 hours and 45 minutes.

As shown in Table 1, the TEGDA crosslinker (having a similar structure to TEPA) showed similar crosslinking rates and decreased swelling with increased hot roll duration. The product formed using TEGDA was also very brittle after a hot roll duration of 9 hours and 45 minutes and exhibited none of the original elastomeric properties.

As further shown in Table 1, the POPTA crosslinker (with three primary amino groups) was relatively slow to crosslink the terpolymer and achieved 100% crosslinking in less than 9 hours and 45 minutes. The swelling rates for POPTA also increased with time (for example, a swell index of greater than 6 at 1 hour and 45 minutes and a swell index of 15.7 at 3 hours and 45 minutes) but then decreased with time (for example, a swell index of 10 after 9 hours and 45 minutes).

Finally, as shown in Table 1, the DETDA crosslinker (a highly substituted aromatic amine) was the slowest of the four amines to crosslink despite the presence of the cure accelerator (for example, only 33% pellet mass was crosslinked after 9 hours and 45 minutes). However, even the small amount of crosslinked terpolymer was effective in absorbing the solvent as reflected by the relatively high swell indices (for example, a swell index of greater than 29 at 1 hour and 45 minutes). These results indicated a poor diffusion of the crosslinker into the matrix of the terpolymer pellet, thus implying predominantly surface crosslinking.

Figure 2:
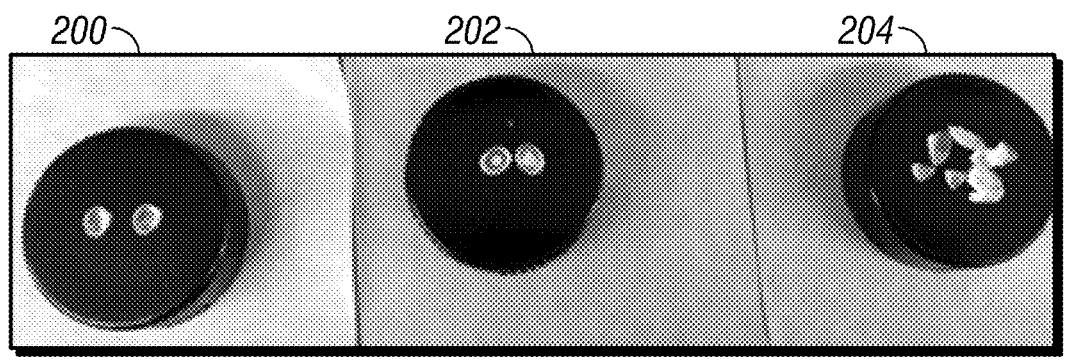
FIGS. 2 and 3 are photographs of products of the example compositions in accordance with embodiments of the disclosure.
Figure 3:
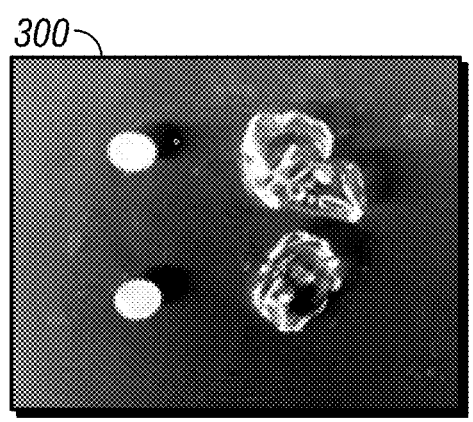

FIGS. 2 and 3 are photographs of the resulting product prepared according to the experiments described above.

FIG. 2 depicts the resulting product prepared using TEPA and shows a photograph 200 of the untreated terpolymer pellets, a photograph 202 of the treated terpolymer pellets after hot rolling, and a photograph 204 of the swollen product. The break-up of the product shown in photograph 204 illustrates the brittleness of the TEPA product due to excessive crosslinking after 9 hours and 45 minutes. FIG. 3 depicts the resulting product prepared using DETDA and shows a photograph 300 of the treated terpolymer pellets on the left and the xylene-swollen pellets on the right.

As shown by the results in Table 1 and the plot depicted in FIG. 1, an LCM having an elastomeric polymer treated with a crosslinker amine may swell by absorbing about 20 to about 34 times of their weight of a non-aqueous liquid. Thus, by using a suitable elastomeric polymer having reactive groups and other monomers and mixing with a suitable crosslinker amine, an oil-swellable composition may be produced that can absorb any non-aqueous fluid used in well treatments and other operations. The use of such compositions with a non-swelling solvent to place in a loss circulation zone may reduce or eliminate the loss of fluids in the zone.

Another example oil-swellable elastomeric polymer and crosslinker amine composition was prepared using commercially available pellets of ethylene/methyl acrylate/glycidyl methacrylate terpolymer but without treatment with a cure accelerator while maintaining the other preparation and testing conditions the same as the composition with the cure accelerator. The oil-swellable elastomeric polymer and crosslinker amine composition without a cure accelerator was prepared using TEPA at an elastomer:TEPA weight ratio of 200:1. As described above, the polymer-crosslinker-silica powder mixture was hot rolled in a roller oven at a temperature of about 200° F. for three different durations. The wet weights and dry weights of the solid product were measured as described above. The swell index and percent increase in weight due to swelling were also measured as described above, with the swelling measurements performed at 180° F.

Table 2 shows the hot roll durations at 200° F., the wet weight, dry weight, % of the terpolymer pellet mass that was crosslinked, the swell index, and the percent increase in weight for each polymer-crosslinker-accelerator-silica powder composition and duration:

TABLE 2

HOT ROLLING DURATIONS AND RESULTING PROPERTIES FOR
EXAMPLE OIL-SWELLABLE ELASTOMERIC POLYMER AND CROSSLINKER
AMINE COMPOSITIONS WITHOUT CURE ACCELERATOR

| Amine | Hot Roll Duration (hours:min) | Wet weight of swollen product per 0.06 g of hot rolled pellets (g) | Dry weight of dried product(g) | % terpolymer pellet mass crosslinked | Swell index | % increase in weight |
|---|---|---|---|---|---|---|
| TEPA | 1 | 0 (dissolved) | Not measured | 0 | — | — |
| TEPA | 3 | 1.05 | 0.065 | 93 | 14 | 1500 |
| TEPA | 7 | 0.44 | Not measured | Not Measured | 5.3 | 630 |

As shown in Table 2, some compositions may achieve crosslinking of the solid elastomer by an amine to convert it into swellable form without using a cure accelerator. However, the cure accelerator may be used to shorten the cure times at a given temperature or accomplish curing at lower temperatures.

Another example oil-swellable elastomeric polymer and crosslinker amine composition was prepared by replacing the solid elastomer ethylene/methyl acrylate/glycidyl methacrylate with ethylene/glycidyl methacrylate and using poly(propyleneoxy)diamine (POPDA), available as Jeffamine D400 from Huntsman Corporation of The Woodlands, Tex., USA, as the crosslinker amine. The molar ratio of ethylene to glycidyl methacrylate in the elastomer was 92:8. The commercially-available elastomer used to form the example composition had a melting index of 5 kg/10 min and a % elongation of 400.

To prepare the composition, the weight ratio of elastomer to amine to cure accelerator to anti-agglomerating agent was kept the same as in the previous examples. A hot roll temperature of about 300° F. was used with a rolling duration of about 2 hours. For the swelling tests, 0.11 g of cured pellets were swollen at about 180° F. in xylenes and in diesel for about 1.5 hrs. When tested in xylenes, the ethylene/glycidyl methacrylate and POPDA composition had a swollen weight of 0.76 g and a swell index of 5.9. When tested in diesel, the ethylene/glycidyl methacrylate and POPDA composition had a swollen weight of 0.91 g and a swell index 7.3.

This ethylene/glycidyl methacrylate and POPDA composition and corresponding test results show that the curing of the composition may be performed using only epoxy monomer and that the acrylate polymer is not required to provide swellable compositions. The results also show that when the polarity of the elastomer is lowered by the omission of a polar monomer, an increase in the non-polar olefinically unsaturated hydrocarbon monomer, or both, a higher swell index is observed in more non-polar solvents, such as diesel, as compared to relatively more polar solvents such as xylenes.

Compositions and Processes for Forming an Oil-Swellable LCM

In some embodiments, an oil-swellable LCM may be formed from a composition that includes elastomeric polymer particles and a crosslinker amine, and an anti-agglomerating agent. In some embodiments, the elastomeric polymer is a copolymer having an olefinically unsaturated hydrocarbon monomer and a monomer having an epoxy pendant group. In some embodiments, the monomer having an epoxy pendant group may be a glycidyl acrylate monomer (for example, glycidyl methacrylate). In some embodiments, the molar ratio of unsaturated hydrocarbon monomer to epoxy containing monomer is in the range of about 75:25 to about 99:1. In some embodiments the elastomeric polymer includes an additional polar monomer. In some embodiments, the molar ratio of the sum of olefinically unsaturated hydrocarbon monomer and the polar monomer to epoxy containing monomer is in the range of about 75:25 to about 99:1. Examples of suitable polar monomers include olefinically unsaturated esters. In some embodiments, suitable olefinically unsaturated esters include methyl acrylate, methyl methacryalate, ethyl acrylate, ethyl methacrylate, butyl acrylate, and butyl methacrylate. In some embodiments, the elastomeric polymer particles may be ethylene/methyl acrylate/glycidyl methacrylate terpolymer. In some embodiments, the ethylene/methyl acrylate/glycidyl methacrylate terpolymer has monomer weight percentages of about 64:24:8 respectively. In some embodiments, the elastomeric polymer particles may be ethylene/glycidyl methacrylate copolymer. In some embodiments, the ethylene/glycidyl methacrylate copolymer has monomer weight percentages of about 92:8.

In some embodiments, the crosslinker amine may be an aliphatic polyamine amine (for example, polyethyleneimine and ethylene diamine and its homologs), polyether amines (for example polyethylene glycol polyamines and polypropylene glycol polyamines), and aromatic polyamines (such as toluene diamines and phenylenediamines). In some embodiments, the crosslinker amine may include at least one of: tetraethylene pentaamine (TEPA), triethylene glycol diamine (TEGDA), polyoxypropylene triamine (POPTA), polyoxypropylene diamine (POPDA), and diethyltoluenediamine (DETDA). In other embodiments, other suitable crosslinker amines may be used. In some embodiments, the weight ratio of elastomeric polymer to crosslinker is in the range of about 10:1 to about 4:1.

In some embodiments, the oil-swellable LCM may be formed from a composition that also includes a cure accelerator suitable for amines, such that the composition includes the elastomeric polymer particles, the crosslinker amine, the anti-agglomerating agent, and the cure accelerator. In some embodiments, the cure accelerator is an accelerator having both hydroxyl groups and reactive amine groups. In some embodiments, the cure accelerator is an alkanolamine. In some embodiments, the cure accelerator may be Accelerator 399 available from Huntsman Corporation of The Woodlands, Tex., USA. In some embodiments, the weight ratio of amine to cure accelerator is in the range of about 100:1 to about 5:1.

In some embodiments, the anti-agglomerating agent may be any suitable inorganic powder. For example, in some embodiments, the anti-agglomerating agent may include silica powder, clay, and talc. In some embodiments, the silica powder is precipitated silica powder. In some embodiments, for example, the silica powder may have a d50 particle size distribution of 85 um. In some embodiments, the anti-agglomerating agent is added in amounts of about 0.1 wt % to about 20 wt % of the elastomeric polymer particles.

In some embodiments, the weight ratio of the elastomeric polymer particles to the crosslinker amine is in the range of about 50:1 to about 500:1. In some embodiments, the amount of the anti-agglomerating agent is at least .5% by weight of the elastomeric polymer particles. In embodiments using a cure accelerator, the weight ratio of crosslinker amine to cure accelerator.

In some embodiments, the elastomeric polymer may be crosslinked in the solid state (for example, as polymer pellets). In some embodiments, the resulting LCM may have 100% of the mass of elastomeric polymer pellets crosslinked by the crosslinker amine. In some embodiments, only the epoxy group of the elastomeric polymer may be crosslinked using the crosslinker amine. As will be appreciated, the epoxy groups of the polymer that are reactive to the crosslinker amine may form non-labile bonds. In some embodiments, the resulting LCM may absorb about 20 to about 34 times its weight when introduced to a loss circulation zone in the presence of a non-aqueous fluid, such as a synthetic-based mud (SBM) or an oil-based mud (OBM).

Figure 4:
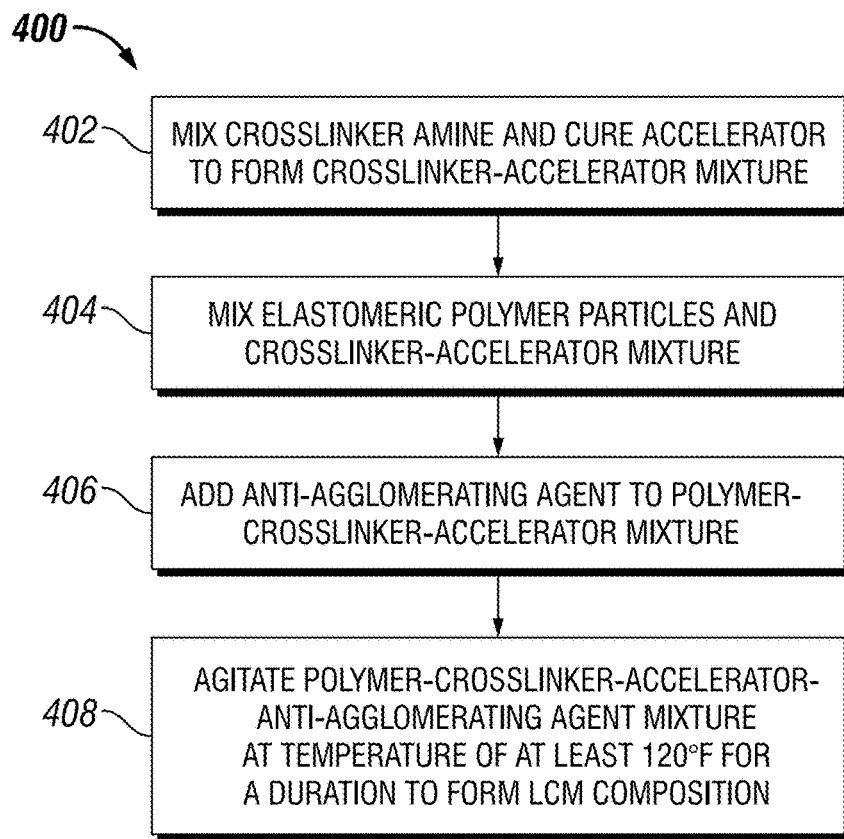
FIG. 4 is a block diagram of a process for forming an LCM from an elastomeric polymer and crosslinker amine in accordance with embodiments of the disclosure.

FIG. 4 depicts a process 400 for forming an LCM from an elastomeric polymer and crosslinker amine in accordance with an embodiment of the disclosure. A crosslinker amine and cure accelerator may be mixed to form a crosslinker-accelerator mixture (block 402). For example, in some embodiments the crosslinker amine may include at least one of: tetraethylene pentaamine (TEPA), triethylene glycol diamine (TEGDA), polyoxypropylene triamine (POPTA), polyoxypropylene diamine (POPDA), and diethyltoluenediamine (DETDA). The cure accelerator may be an accelerator suitable for amine/epoxy coupling reactions, such as an alkanolamine. In some embodiments, the amine and the cure accelerator may be pre-dissolved in a solvent to form the crosslinker-accelerator mixture.

Elastomeric polymer particles may be mixed with the crosslinker-accelerator mixture (block 404). For example, in some embodiments the elastomeric polymer particles may include an ethylene/methyl acrylate/glycidyl methacrylate terpolymer or ethylene/glycidyl methacrylate copolymer formed in pellets or other particles. In some embodiments, the mixing of the elastomeric polymer particles with the crosslinker-accelerator mixture may be performed by spray coating or dripping the crosslinker-accelerator liquid mixture onto the surface of the elastomer polymer particles. An anti-agglomerating agent may be mixed with the polymer-crosslinker-accelerator mixture (block 406). In some embodiments, the anti-agglomerating agent may be silica powder.

The resulting polymer-crosslinker-accelerator-anti-agglomerating agent mixture may be agitated at a temperature of at least 120° F. for a duration to from the LCM composition (block 408). For example, in some embodiments, the mixture may be agitated at a temperature of at least 150° F., such as 200° F. In some embodiments, the mixture may be rolled, such as in a roller oven. In some embodiments, the duration may be at least one hour, at least one hour and 45 minutes, at least two hours, at least three hours, at least three hours and 45 minutes, or greater than three hours and 45 minutes.

Figure 5:
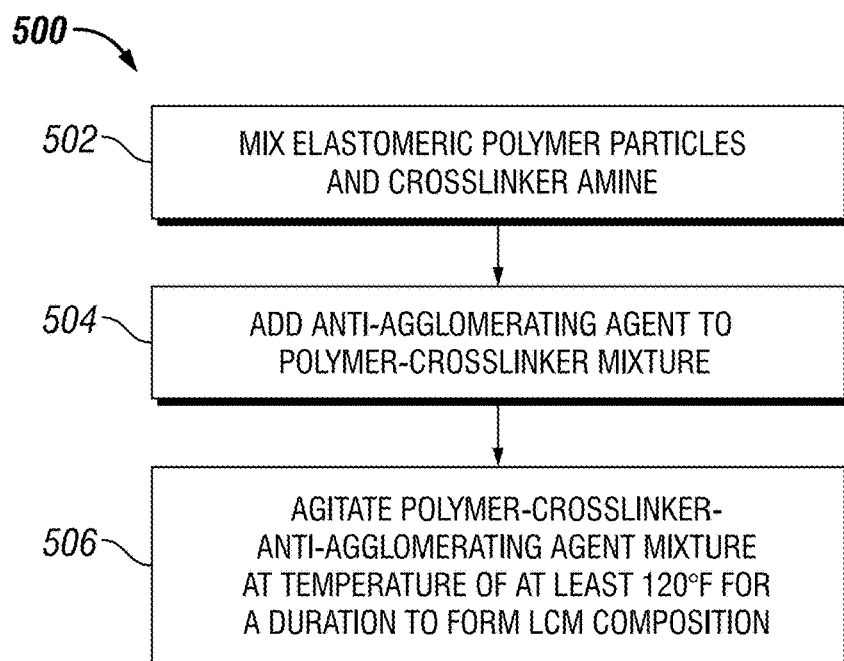
FIG. 5 is a block diagram of another process for forming an LCM from an elastomeric polymer and crosslinker amine in accordance with embodiments of the disclosure.

FIG. 5 depicts a process 500 for forming an LCM from an elastomeric polymer and crosslinker amine in accordance with another embodiment of the disclosure. As shown in FIG. 5, elastomeric polymer particles may be mixed with a crosslinker amine (block 502). For example, in some embodiments the elastomeric polymer particles may include an ethylene/methyl acrylate/glycidyl methacrylate terpolymer or ethylene/glycidyl methacrylate copolymer formed in pellets or other particles. In some embodiments, the mixing of the crosslinker amine with the elastomeric polymer particles may be performed by spray coating or dripping the crosslinker amine onto the surface of the elastomer polymer particles. In some embodiments the crosslinker amine may include at least one of: tetraethylene pentaamine (TEPA), triethylene glycol diamine (TEGDA), polyoxypropylene triamine (POPTA), polyoxypropylene diamine (POPDA), and diethyltoluenediamine (DETDA).

Next, an anti-agglomerating agent may be mixed with the polymer-crosslinker mixture (block 504). In some embodiments, the anti-agglomerating agent may be silica powder. The resulting polymer-crosslinker-anti-agglomerating agent mixture may be agitated at a temperature of at least 120° F. for a duration to from the LCM composition (block 506). In some embodiments, the mixture may be rolled, such as in a roller oven. In some embodiments, the duration may be at least one hour, at least one hour and 45 minutes, at least two hours, at least three hours, at least three hours and 45 minutes, or greater than three hours and 45 minutes.

In some embodiments, the curing behavior (for example, the time, % of elastomeric polymer crosslinked, swell index, and the like) may be modified by selecting a specific crosslinker amine. For example, as discussed above, a TEPA crosslinker may result in 100% crosslinking of the elastomeric polymer after a relatively shorter duration (for example, about one hour and 45 minutes). In another example, a DETDA crosslinker may result in less than 40% crosslinking of the elastomeric polymer after a longer duration.

In some embodiments, the oil-swellable LCM may be prepared at the surface of a well site having a well accessing a lost circulation zone in a formation. The oil-swellable LCM may be added to a non-swellable carrier fluid and introduced (e.g., by pumping) downhole to positing the oil-swellable LCM into contact with the lost circulation zone. As used herein the term "non-swellable carrier fluid" refers to a fluid that does not swell the oil-swellable LCM in the manner described above (for example, a swelling index of 1). In some embodiments, the non-swellable carrier fluid may include alcohols, acetone and other ketones (e.g., methyl ethyl ketones and cyclohexanone), and alcohol ethers (e.g., monobutyl ethylene glycol). Upon contact with a non-aqueous fluid, such as a drilling fluid or one or more components of a drilling fluid, the oil-swellable LCM may swell and alter the lost circulation zone (for example, by entering and blocking porous and permeable paths, cracks, and fractures in a formation in the lost circulation zone, such as forming a structure in a mouth or within a fracture). In some embodiments, the oil-swellable LCM may be added to a non-aqueous drilling fluid before or during introduction (e.g., by pumping) downhole.

In some embodiments, the oil-swellable LCM may be allowed to interact with the lost circulation zone and a non-aqueous fluid for a contact period. For example, the contact period may be of sufficient duration to enable formation of a swollen particles as a result of the interaction between the oil-swellable LCM and the non-aqueous fluid.

The oil-swellable LCM particles advantageously provide particle shape retention upon swelling and inter-particle crosslinking to increase the rigidity of the LCM and improve the reduction or elimination of fluid loss in a loss circulation zone. As will be appreciated, due to the crosslinking the oil-swellable elastomeric polymer may be insolubilized in any liquid that swells the elastomeric polymer.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A method of forming a lost circulation material (LCM), comprising:
    applying a crosslinker to the surface of a plurality of elastomeric polymer particles to form a first mixture, the plurality of elastomeric polymer particles comprising an olefinically unsaturated hydrocarbon monomer and a monomer comprising an epoxy pendant group, the molar ratio of unsaturated hydrocarbon monomer to epoxy containing monomer is in the range of about 75:25 to about 99:1, and the crosslinker comprising an amine, wherein the crosslinker crosslinks the epoxy groups of the plurality of elastomeric polymer particles, wherein applying the crosslinker to the surface of the plurality of elastomeric polymer particles to form the first mixture comprises spray coating the crosslinker on the plurality of elastomeric polymer particles;
    adding an anti-agglomerating agent to the first mixture to form a second mixture, wherein the anti-agglomerating agent comprises at least 0.5% by weight of the plurality of elastomeric polymer particles; and
    agitating the second mixture at a temperature of at least 200° F. for a duration to produce the lost circulation material (LCM), wherein the plurality of elastomeric polymer particles in the LCM are crosslinked in a solid state by the crosslinker.

2. The method of claim 1, wherein applying the crosslinker to the surface of the plurality of elastomeric polymer particles to form the first mixture further comprises applying a cure accelerator with the crosslinker to the surface of the plurality of elastomeric polymer particles.

3. The method of claim 2, wherein the cure accelerator comprises an alkanolamine.

4. The method of claim 2, wherein the weight ratio of the crosslinker to the cure accelerator is in the range of 100:1 to 5:1.

5. The method of claim 2, wherein the weight ratio of the plurality of elastomeric polymer particles to the crosslinker and cure accelerator is in the range of 50:1 to 500:1.

6. The method of claim 1, wherein the duration comprises at least one hour, at least two hours, or at least three hours.

7. The method of claim 1, wherein the plurality of elastomeric polymer particles comprise ethylene/glycidyl methacrylate copolymer particles.

8. The method of claim 1, wherein the amine comprises an aliphatic polyamine amine, a polyether amine, or an aromatic polyamine.

9. The method of claim 1, wherein the amine comprises at least one of: tetraethylene pentaamine (TEPA), triethylene glycol diamine (TEGDA), polyoxypropylene triamine (POPTA), polyoxypropylene diamine (POPDA), and diethyltoluenediamine (DETDA).

10. The method of claim 1, wherein the anti-agglomerating agent comprises silica powder.

11. The method of claim 1, wherein agitating the second mixture at the temperature of at least 200° F. for the duration comprises rolling the second mixture in a roller oven.

12. The method of claim 1, comprising selecting the duration to determine a swelling capability of the LCM.

13. The method of claim 12, wherein the swelling capability comprises a swell index, the swell index comprising a difference between a dry weight of the LCM and a wet weight of the LCM divided by the dry weight, the wet weight comprising a weight of the LCM after swelling in a solvent and the dry weight comprising a weight of the LCM after evaporation of the solvent.

14. The method of claim 1, wherein the elastomeric polymer particles comprise ethylene/methyl acrylate/glycidyl methacrylate terpolymer particles.

* * * * *